ns010763959B2

United States Patent
Kim et al.

(10) Patent No.: US 10,763,959 B2
(45) Date of Patent: Sep. 1, 2020

(54) AUXILIARY DEVICE FOR SETTING WAVELENGTH AND METHOD FOR SETTING OPTICAL WAVELENGTH OF OPTICAL NETWORK UNIT

(71) Applicant: SOLiD, INC., Seongnam-si, Gyeonggi-do (KR)

(72) Inventors: Tae Hyeong Kim, Anyang-si (KR); Won Song Chang, Seongnam-si (KR); Sun Keun Yu, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/777,475

(22) PCT Filed: Nov. 18, 2016

(86) PCT No.: PCT/KR2016/013350
§ 371 (c)(1),
(2) Date: Aug. 8, 2018

(87) PCT Pub. No.: WO2017/086742
PCT Pub. Date: May 26, 2017

(65) Prior Publication Data
US 2018/0337728 A1 Nov. 22, 2018

(30) Foreign Application Priority Data
Nov. 20, 2015 (KR) .................. 10-2015-0163455

(51) Int. Cl.
*H04B 10/079* (2013.01)
*H04J 14/02* (2006.01)
*H04B 10/27* (2013.01)

(52) U.S. Cl.
CPC ..... *H04B 10/07957* (2013.01); *H04B 10/079* (2013.01); *H04B 10/07955* (2013.01);
(Continued)

(58) Field of Classification Search
CPC ............................................. H04B 10/07957
See application file for complete search history.

(56) References Cited

U.S. PATENT DOCUMENTS 5,907,417 A * 5/1999 Darcie ................ H04B 10/035
398/20
6,661,974 B1 12/2003 Ooi et al.
(Continued)

OTHER PUBLICATIONS

International Search Report for PCT/KR2016/013350 dated Feb. 21, 2017 [PCT/ISA/210].
(Continued)

*Primary Examiner* — Jai M Lee
(74) *Attorney, Agent, or Firm* — Sughrue Mion, PLLC

(57) ABSTRACT

A wavelength-setting auxiliary device according to an embodiment of the inventive concept includes an optical wavelength analyzer configured to transmit a test signal having a first wavelength to an optical line terminal, and to execute a central wavelength detection algorithm based on a result of detecting power of a return signal for the test signal to set optical wavelength information of a tunable optical module, and a connector connected to the tunable optical module for interfacing data transmitted between the optical wavelength analyzer and the tunable optical module.

8 Claims, 5 Drawing Sheets

(52) U.S. Cl.
CPC .............. *H04B 10/27* (2013.01); *H04J 14/02* (2013.01); *H04J 14/0227* (2013.01); *H04J 14/0275* (2013.01); *H04J 14/0293* (2013.01)

(56) References Cited

U.S. PATENT DOCUMENTS

| | | | | |
|---|---|---|---|---|
| 6,973,228 | B2* | 12/2005 | Chang | G01J 9/0246 372/32 |
| 7,167,237 | B2* | 1/2007 | Shimizu | G01M 11/3136 356/73.1 |
| 8,750,702 | B1* | 6/2014 | Figueira | H04B 10/00 398/16 |
| 10,630,415 | B2* | 4/2020 | Nomura | G02B 6/4215 |
| 2002/0130251 | A1* | 9/2002 | Myers | H04B 10/07957 250/226 |
| 2004/0131366 | A1* | 7/2004 | Tsushima | H04B 10/58 398/197 |
| 2006/0147211 | A1 | 7/2006 | Kim et al. | |
| 2007/0041006 | A1* | 2/2007 | Abbott | H04B 10/071 356/73.1 |
| 2007/0092256 | A1* | 4/2007 | Nozue | H04J 14/0238 398/72 |
| 2008/0166127 | A1* | 7/2008 | Kazawa | H04J 14/025 398/79 |
| 2008/0267627 | A1* | 10/2008 | Effenberger | H04J 14/02 398/72 |
| 2009/0269053 | A1* | 10/2009 | Yang | H04L 41/0677 398/22 |
| 2012/0070146 | A1* | 3/2012 | Hinderthuer | H04B 10/07957 398/13 |
| 2012/0082469 | A1* | 4/2012 | Xia | H04B 10/572 398/196 |
| 2012/0251122 | A1* | 10/2012 | Grobe | H04J 14/0282 398/95 |
| 2013/0077968 | A1* | 3/2013 | Yang | H04B 10/40 398/45 |
| 2013/0315585 | A1* | 11/2013 | Na | H04J 14/02 398/34 |
| 2015/0125153 | A1* | 5/2015 | Lee | H04B 10/0793 398/79 |
| 2016/0065305 | A1* | 3/2016 | Endo | H04B 10/07955 398/34 |
| 2017/0054504 | A1* | 2/2017 | Poehlmann | H04J 14/025 |
| 2017/0093515 | A1* | 3/2017 | Tanaka | H04B 10/564 |
| 2017/0134112 | A1* | 5/2017 | Inada | H01S 5/0687 |
| 2018/0191434 | A1* | 7/2018 | Champavere | H04B 10/071 |

OTHER PUBLICATIONS

Communication issued in the European Patent Office in corresponding European Patent Application No. 16866694.9 dated Jul. 8, 2019.

* cited by examiner

AUXILIARY DEVICE FOR SETTING WAVELENGTH AND METHOD FOR SETTING OPTICAL WAVELENGTH OF OPTICAL NETWORK UNIT

CROSS-REFERENCE TO RELATED APPLICATIONS

This application is a National Stage of International Application No. PCT/KR2016/013350, filed Nov. 18, 2016, and claims priority from Korean Patent Application No. 10-2015-0163455, filed Nov. 20, 2015, the contents of which are incorporated herein by reference in their entireties.

BACKGROUND

1. Field

The inventive concept relates to an auxiliary device for setting a wavelength and a method of setting an optical wavelength of an optical network unit, and more particularly, to an auxiliary device for setting a wavelength for setting an appropriate optical wavelength of an optical signal in a passive optical network (PON) based on wavelength division multiplexing (WDM) and a method of setting an optical wavelength of an optical network unit.

2. Description of the Related Art

With the recent development of information technology, it is required to improve the transmission capacity of a subscriber network due to increasing Internet and multimedia communication traffic. As one of methods of improving the transmission capacity of the subscriber network, wavelength division multiplexing-passive optical network (WDM-PON) has attracted attention.

Since time division multiplexing (TDM) PON (TDM-PON) corresponding to a wavelength division passive optical network divides and transmits transmission resources in time units, synchronization is required for signals and the limitation of the transmission capacity is obvious. On the other hand, the wavelength division passive optical network does not require signal synchronization, and a broad bandwidth may be secured by multiplexing wavelengths by subscriber or service.

Meanwhile, in the wavelength division passive optical network, signals of various wavelengths are simultaneously transmitted and received. Therefore, when the wavelength of a specific channel deviates from a predetermined wavelength by an external factor such as a change in a temperature of the external air, communication is interrupted or interferes with wavelengths of other channels, resulting in serious degradation of communication quality.

Accordingly, as a method of improving the quality of a service of the WDM-PON, it is required to develop a technique that can more easily and effectively implement wavelength locking or wavelength stabilization of a light source to be used.

SUMMARY

The inventive concept is directed to an auxiliary device for setting a wavelength and a method of setting an optical wavelength of an optical network unit, which may easily and effectively control a wavelength of an optical signal output from the optical network unit.

The auxiliary device for setting a wavelength and the method of setting an optical wavelength of an optical network unit according to the technical idea of the inventive concept are not limited to the above objectives, but other objectives not described herein may be clearly understood by those of ordinary skilled in the art from descriptions below.

According to an aspect of the inventive concept, a wavelength-setting auxiliary device includes an optical wavelength analyzer configured to transmit a test signal having a first wavelength to an optical line terminal, and to execute a central wavelength detection algorithm based on a result of detecting power of a return signal for the test signal to set optical wavelength information of a tunable optical module; and a connector connected to the tunable optical module for interfacing data transmitted between the optical wavelength analyzer and the tunable optical module.

In an example embodiment, the optical wavelength analyzer may include a reception signal detector configured to detect a reception signal from the optical line terminal; a reception signal analyzer configured to detect a wavelength and power of the reception signal and transmit the optical wavelength information to the connector; and an optical wavelength tunable transmitter configured to transmit the test signal.

In an example embodiment, the optical wavelength analyzer may be configured to analyze a line management signal received from the optical line terminal and extract wavelength information of the line management signal.

In an example embodiment, the optical wavelength analyzer may be configured to select the first wavelength based on the wavelength information of the line management signal to transmit the test signal, and to determine whether a result of detecting the power of the return signal meets a predetermined condition.

In an example embodiment, the optical wavelength analyzer may be configured to execute the central wavelength detection algorithm for the return signal to set the optical wavelength information of the tunable optical module when the result of detecting the power of the return signal meets the predetermined condition.

In an example embodiment, the predetermined condition may be that the power of the return signal is greater than a specific level.

In an example embodiment, the wavelength-setting auxiliary device may further include a screen output unit configured to display the optical wavelength information such that a user may monitor the optical wavelength information.

In an example embodiment, the connector may be configured to support at least one of an SFP interface, an SFP+ interface, an XFP interface, and a CFP interface.

According to another aspect of the inventive concept, a method of setting an optical wavelength of an optical network unit includes analyzing a line management signal received from an optical line terminal and extracting wavelength information of the line management signal; selecting a first wavelength based on the wavelength information of the line management signal to transmit a test signal, and determining whether a result of detecting power of a return signal for the test signal meets a predetermined condition; and executing a central wavelength detection algorithm for the return signal to set optical wavelength information of a tunable optical module when the result of detecting the power of the return signal meets the predetermined condition.

In an example embodiment, the method may further include, before the extracting of the wavelength information, connecting a cable connected to the optical network unit to a wavelength-setting auxiliary device.

In an example embodiment, the method may further include, after the setting of the optical wavelength information, displaying the optical wavelength information such that a user may monitor the optical wavelength information; and disconnecting the cable from the wavelength-setting auxiliary device and connecting the cable to the optical network unit through the tunable optical module.

In an example embodiment, the predetermined condition may be that the power of the return signal is greater than a specific level.

According to an auxiliary device for setting a wavelength and a method of setting an optical wavelength of an optical network unit according to the inventive concept, optical wavelength setting of a tunable optical module of the optical network unit may be automatically and easily processed in the field.

BRIEF DESCRIPTION OF THE FIGURES

These and/or other aspects will become apparent and more readily appreciated from the following description of the embodiments, taken in conjunction with the accompanying drawings in which.

DETAILED DESCRIPTION OF EXEMPLARY EMBODIMENTS

Figure 1:
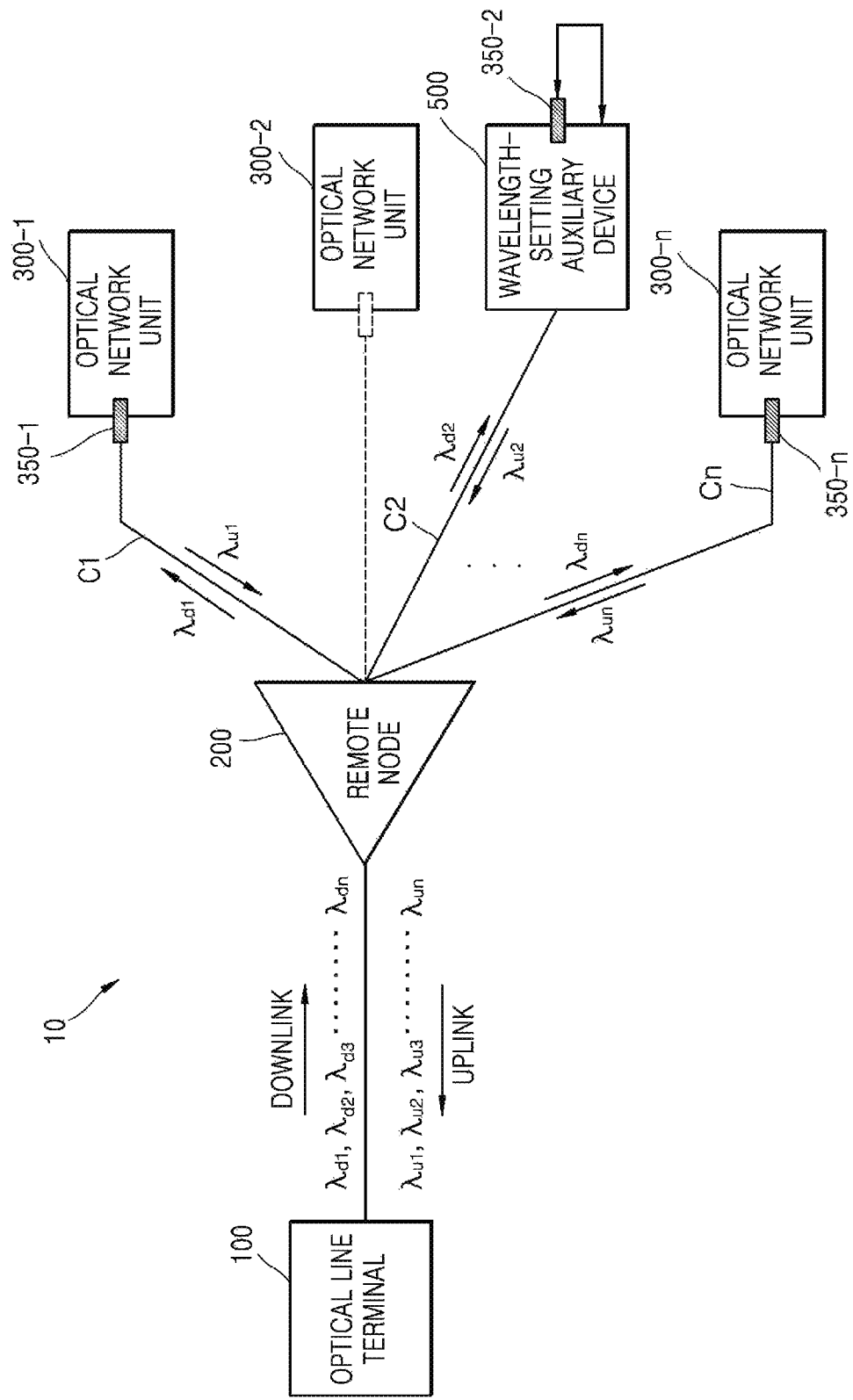
FIG. 1 is a view of a wavelength-division optical network according to an embodiment of the inventive concept.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software or a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, embodiments of the inventive concept will be described in detail.

Figure 2:
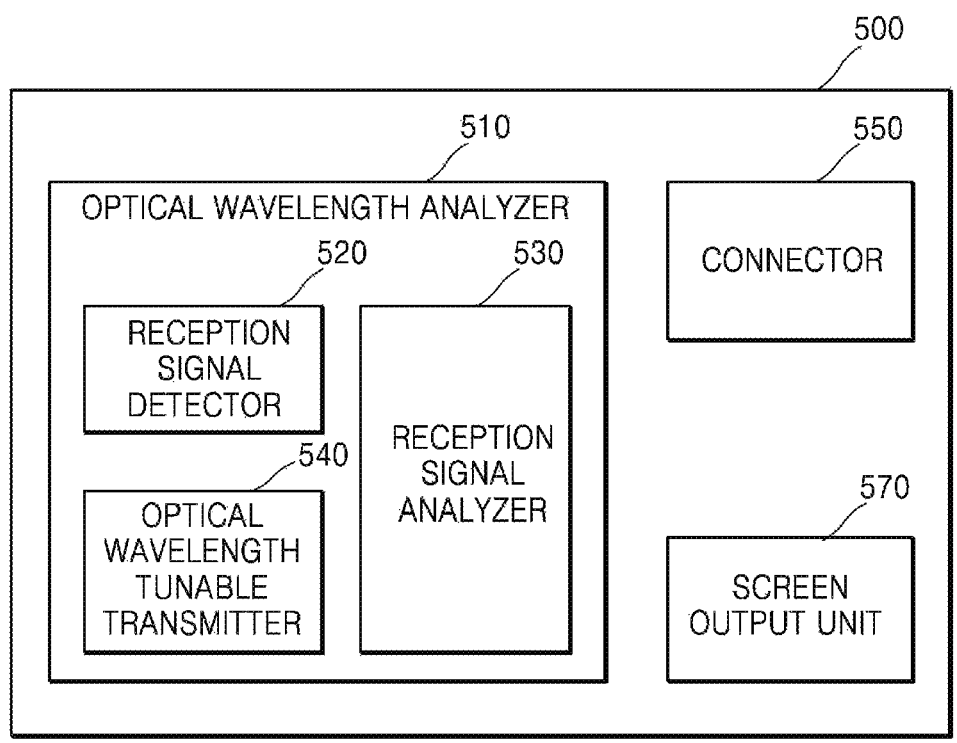
FIG. 2 is a detailed block diagram of an auxiliary device for setting a wavelength shown in FIG. 1.

FIG. 1 is a view of a wavelength-division optical network 10 according to an embodiment of the inventive concept. FIG. 2 is a detailed block diagram of an auxiliary device for setting a wavelength shown in FIG. 1.

Referring to FIGS. 1 and 2, the wavelength-division optical network 10 may include an optical line terminal (OLT) 100, a remote node (RN) 200, and a plurality of optical network units (ONUs) 300-1 to 300-$n$.

The optical line terminal 100 may include n (n is an integer of 1 or more) channel cards. Each channel card (not shown) corresponds to each of the optical network units 300-1 to 300-$n$ and may communicate with the corresponding optical network unit using a signal having different optical wavelengths respectively allocated for the optical network units 300-1 to 300-$n$.

That is, optical signals (downlink signals) for respective wavelengths $\lambda d1, \lambda d2, \lambda d3, \ldots$ and $\lambda dn$ generated by each channel card (not shown) are transmitted to the remote node 200 through a single optical line, and the optical signals for the respective wavelengths separated by the remote node 200 are transmitted to the optical network units 300-1 to 300-$n$ through individual cables C1 to Cn, respectively. Conversely, optical signals (uplink signals) for respective wavelengths $\lambda u1, \lambda u2, \lambda u3, \ldots$ and $\lambda un$ generated by the optical network units 300-1 to 300-$n$ also pass through the above elements.

The optical line terminal 100 may multiplex the optical signals for the respective wavelengths $\lambda d1, \lambda d2, \lambda d3, \ldots$ and $\lambda dn$ into one optical signal and output the optical signal.

The remote node 200 may be connected to the optical line terminal 100 through a single optical line and may be connected to the optical network units 300-1 to 300-$n$ through the cables C1 to Cn provided for respective channels. The remote node 200 may receive the downlink signals and, according to wavelengths of the downlink signals, transmit the downlink signals to the optical network units 300-1 to 300-$n$ corresponding to the respective wavelengths. Here, the remote node 200 may be implemented with an optical filter such as a WDM filter.

The wavelength-division optical network 10 is implemented on a principle that n independent communication channels are formed between the optical line terminal 100 and the optical network units 300-1 to 300-$n$.

The optical network units 300-1 to 300-$n$ may include tunable optical modules 350-1 to 350-$n$, respectively.

The tunable optical modules 350-1 to 350-$n$ may transmit and receive optical signals of a specific wavelength such that the optical network units 300-1 to 300-$n$ may communicate with the optical line terminal 100. The specific wavelength may be determined by optical wavelength information stored in the tunable optical modules 350-1 to 350-$n$. In addition, the tunable optical modules 350-1 to 350-$n$ may be implemented as a removable module.

For the normal operation of the wavelength division multiplexed optical network 10, it is important that the wavelengths λd1, λd2, λd3, . . . and λdn of the downlink signals transmitted from the optical line terminal 100 and the wavelengths λu1, λu2, λu3, . . . and λun of the uplink signals transmitted from the tunable optical modules 350-1 to 350-$n$ of the respective optical network units 300-1 to 300-$n$ coincide with the central wavelength of each channel or do not deviate from a certain level. That is, there is a need for a technique of matching the wavelengths λd1, λd2, λd3, . . . and λdn of the downlink signals with the wavelengths λu1, λu2, λu3, . . . and λun of the uplink signals.

When the wavelengths λd1, λd2, λd3, . . . and λdn of the downlink signals and the wavelengths λu1, λu2, λu3, . . . and λun of the uplink signals are changed by an external factor such as a temperature change of the air, communication is interrupted or interferes with wavelengths of other channels, resulting in serious degradation of communication quality.

Therefore, in order to match the wavelengths λd1, λd2, λd3, . . . and λdn of the downlink signals with the wavelengths λu1, λu2, λu3, . . . and λun of the uplink signals in an embodiment of the inventive concept, a wavelength-setting auxiliary device 500 is used.

Figure 3:
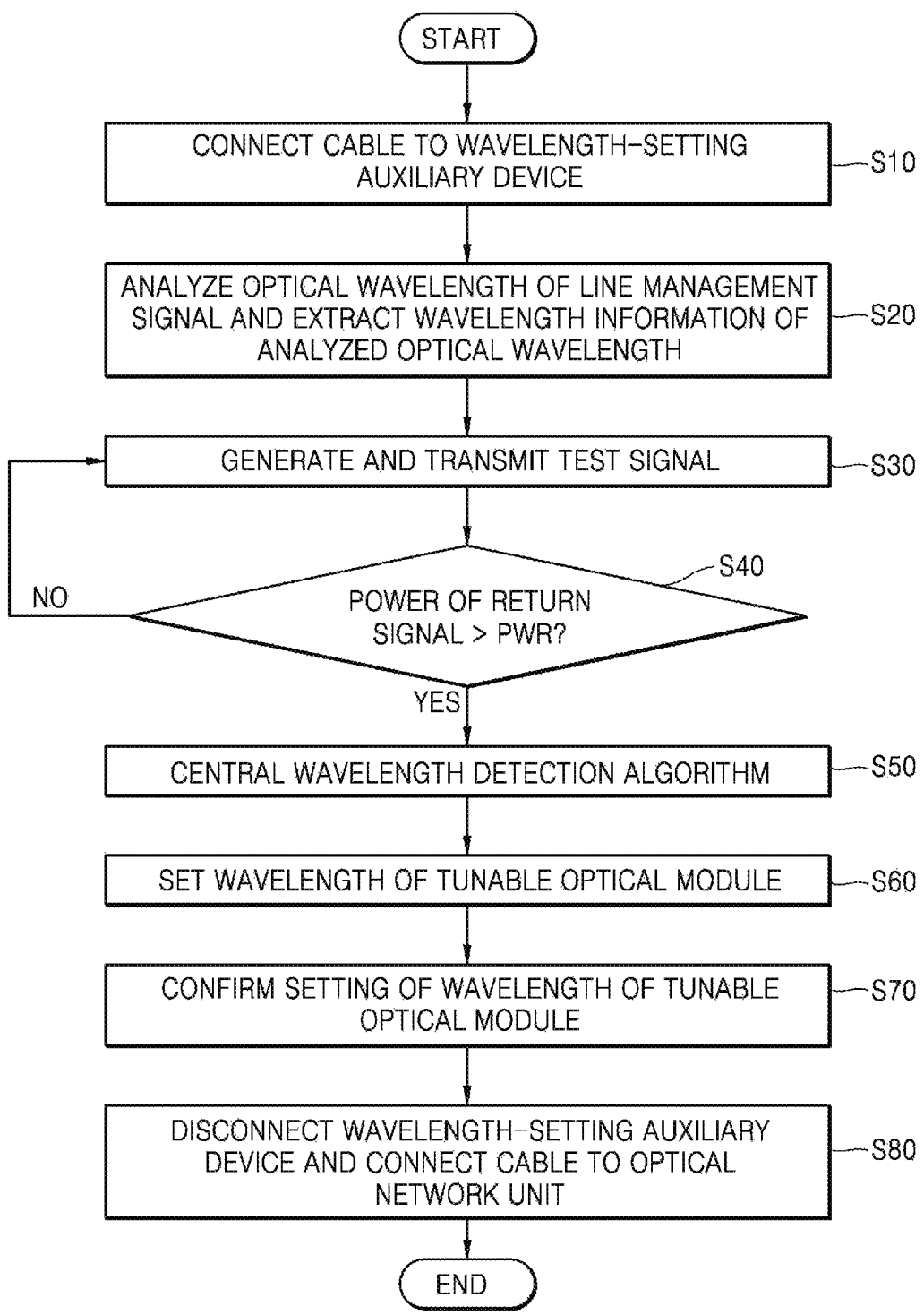
FIG. 3 is a flowchart for explaining a method of setting an optical wavelength of the wavelength-division optical network shown in FIG. 1.

In FIGS. 1 to 3, an example in which the wavelength-setting auxiliary device 500 sets an optical wavelength of the tunable optical module 350-2 will be described. However, the scope of the inventive concept is not limited thereto and substantially the same technical idea may be applied to another module (e.g., 350-1). The wavelength-setting auxiliary device 500 may also be used when setting an optical wavelength of an optical transceiver, for example, a channel card of the optical line terminal 100, as described later below with reference to FIG. 4.

The wavelength-setting auxiliary device 500 may be connected to the cable C2 by separating the cable C2 connected to the optical network unit 300-2. The tunable optical module 350-2 mounted on the optical network unit 300-2 may be detached from the optical network unit 300-2 and may be mounted on the wavelength-setting auxiliary device 500.

FIG. 2 shows a more detailed configuration of the wavelength-setting auxiliary device 500. The wavelength-setting auxiliary device 500 may include an optical wavelength analyzer 510, a connector 550, and a screen output unit 570.

The optical wavelength analyzer 510 may include a reception signal detector 520, a reception signal analyzer 530, and an optical wavelength tunable transmitter 540.

Each of the reception signal detector 520 and the optical wavelength tunable transmitter 540 may be connected to the cable C2 to transmit and receive optical signals to/from the optical line terminal 100 through the remote node 200.

The reception signal detector 520 may detect an optical signal input through the remote node 200, that is, a reception signal, and transmit the optical signal to the reception signal analyzer 530.

The reception signal analyzer 530 may detect a wavelength and power of the reception signal, and may control the optical wavelength tunable transmitter 540 based on the wavelength and the power of the reception signal or may generate optical wavelength information by executing a central wavelength detection algorithm and transmit the optical wavelength information to the tunable optical module 350-2 through the connector 550. The optical wavelength information and the central wavelength detection algorithm will be described later below with reference to FIG. 3.

The optical wavelength tunable transmitter 540 may transmit a test signal having a specific wavelength (e.g., a first wavelength) determined by the control of the reception signal analyzer 530 to the optical line terminal 100 through the remote node 200.

The connector 550 may be connected to the tunable optical module 350-2 mounted (or inserted) on the wavelength-setting auxiliary device 500 and may transmit the optical wavelength information to the tunable optical module 350-2. That is, the connector 550 may interface data transmitted between the optical wavelength analyzer 510 and the tunable optical module 350-2.

The connector 550 may support various types of interfaces of the tunable optical module 350-2. For example, the connector 550 may support at least one of a gigabit interface converter (GBIC) interface, a small form-factor pluggable (SFP) interface, an SFP+ interface, a 10 gigabit small form-factor pluggable (XFP) interface, and a 100 gigabit small form-factor pluggable (CFP) interface. However, the present disclosure is not limited thereto and the connector 550 may support an unstandarized interface. Also, the connector 550 may support an I2C communication function.

The screen output unit 570 may display information generated by the reception signal analyzer 530 including the optical wavelength information such that a user may monitor the information. For example, the screen output unit 570 may be implemented as a liquid crystal display (LCD).

FIG. 3 is a flowchart for explaining a method of setting an optical wavelength of the wavelength-division optical network 10 shown in FIG. 1.

Referring to FIGS. 1 to 3, in operation S10, the cable C2 connected to the optical network unit 300-2 may be connected to the wavelength-setting auxiliary device 500 to set an optical wavelength of the tunable optical module 350-2 of the optical network unit 300-2.

The reception signal detector 520 may detect a line management signal received from the optical line terminal 100 and transmit the detected line management signal to the reception signal analyzer 530. The line management signal may be a signal for verifying a connection state of the optical network unit 300-2, but the scope of the inventive concept is not limited thereto.

The reception signal analyzer 530 may analyze the line management signal and extract wavelength information of the line management signal. That is, in operation S20, the reception signal analyzer 530 may analyze an optical wavelength of the line management signal and extract wavelength information of the analyzed optical wavelength.

The reception signal analyzer 530 may select the first wavelength based on the wavelength information of the line management signal. The first wavelength may be the same as the optical wavelength of the line management signal.

In operation S30, the reception signal analyzer 530 may control the optical wavelength tunable transmitter 540 to generate the test signal having the first wavelength and transmit the test signal to the optical line terminal 100.

In operation S40, the reception signal detector 520 may detect power of a return signal for the test signal transmitted from the reception signal detector 520 and determine whether the result meets a predetermined condition. For example, the predetermined condition may be whether the power of the return signal is greater than a specific level PWR. The specific level PWR may correspond to a level at which it can be determined whether the return signal is a normally detected signal.

When the optical line terminal 100 normally receives the test signal having the first wavelength, the return signal for the test signal is transmitted to the optical network unit 300-2. In this case, the power of the return signal may be greater than the specific level PWR (YES of S40).

When the optical line terminal 100 does not normally receive the test signal having the first wavelength, the return signal for the test signal is not transmitted to the optical network unit 300-2. Therefore, the power of the return signal may be less than the specific level PWR. Here, the reception signal analyzer 530 may control the optical wavelength tunable transmitter 540 to generate a test signal having a new first wavelength, which is obtained by changing the existing first wavelength, to the optical line termination 100 and may detect power of the return signal for the test signal and determine whether the result meets a predetermined condition. The operation of changing the existing first wavelength may be performed by sweeping a wavelength in a window of an available change range around a reference wavelength of the optical network unit 300-2 and comparing powers of respective return signals with each other at that time. Thus, a central wavelength to be actually used may be set in operation S50, which will be described later below.

In addition, the operation of changing the existing first wavelength may be performed by controlling a temperature of a light source of the optical wavelength tunable transmitter 540.

That is, operations S30 and S40 may be repeated until the result meets a predetermined condition. This corresponds to a process of verifying that normal communication with the optical line terminal 100 is possible with an optical signal of the first wavelength. By repeatedly verifying that normal communication with the optical line terminal 100 is possible with an optical signal of the first wavelength, more accurate optical wavelength information capable of normally communicating with the optical line terminal 100 may be set in the tunable optical module 350-2.

In operation S50, when the power of the return signal is greater than the specific level PWR, the reception signal analyzer 530 may determine a central wavelength of the return signal through a central wavelength detection algorithm. The central wavelength detection algorithm may be an algorithm for detecting power for each wavelength of the return signal and generating optical wavelength information based on a wavelength that is the center of the return signal based on the power for each wavelength. For example, when the return signal indicates a Gaussian distribution with respect to an axis of power on an axis of a wavelength, the central wavelength detection algorithm may detect a central wavelength corresponding to a central axis to generate optical wavelength information.

In operation S60, the reception signal analyzer 530 may transmit the optical wavelength information to the tunable optical module 350-2 through the connector 550 and the tunable optical module 350-2 may store the optical wavelength information.

The screen output unit 570 may display information (e.g., state information of the first wavelength, the reception signal detector 520, and the optical wavelength tunable transmitter 540) such that a user may monitor the information. Accordingly, in operation S70, a user may monitor a state of the wavelength-setting auxiliary device 500 using the information, and may control the wavelength-setting auxiliary device 500 to operate normally when necessary (e.g., when the first wavelength is greatly deviated from the reference wavelength).

In operation S80, when the setting of the optical wavelength of the tunable optical module 350-2 is completed through the screen output unit 570, the user may disconnect the wavelength-setting auxiliary device 500 from the cable C2 and connect the cable C2 to the optical network unit 300-2 by installing the tunable optical module 350-2.

Then, the tunable optical module 350-2 may communicate with the optical line terminal 100 with an optical signal of the wavelength based on the set optical wavelength information.

That is, according to the wavelength-division optical network 10 according to the embodiment of the inventive concept, accurate optical wavelength setting of the tunable optical module (e.g., 350-2) of the optical network unit (e.g., 300-2) may be automatically and easily processed in the field.

The method of operating the wavelength-setting auxiliary device 500 according to an embodiment of the inventive concept may be embodied as computer-readable codes on a non-transitory computer-readable recording medium. The non-transitory computer-readable recording medium is any recording medium that can store data which can thereafter be read by a computer system. The non-transitory computer-readable recording medium may include, for example, read-only memory (ROM), random-access memory (RAM), magnetic tapes, magnetic disks, flash memory, optical data storage devices, etc. The non-transitory computer-readable recording medium can also be distributed over computer network-coupled computer systems so that a computer-readable code is stored and executed in a distributive manner.

Figure 4:
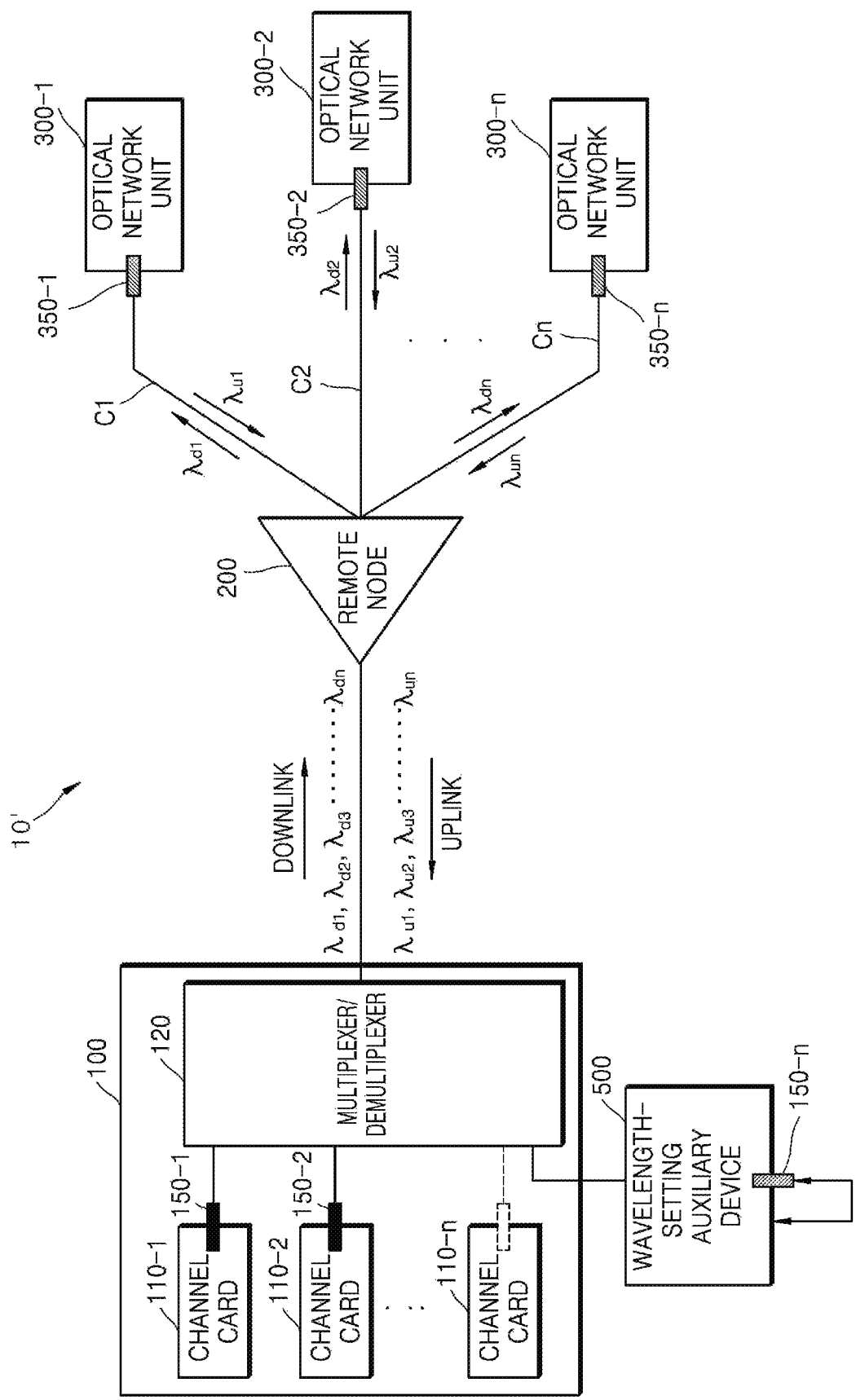
FIG. 4 is a view of a wavelength-division optical network according to another embodiment of the inventive concept.

FIG. 4 is a view of a wavelength-division optical network 10' according to another embodiment of the inventive concept. The wavelength-division optical network 10' of FIG. 4 represents a network in which a central station is configured in an active manner and a subscriber is configured in a passive manner. In FIG. 4, the same reference numerals as in FIGS. 1 to 3 denote the same elements, and descriptions thereof will not be given herein, and only the differences from FIGS. 1 to 3 will be mainly described.

Referring to FIG. 4, the optical line terminal 100 may include n (where n is an integer of 1 or more) channel cards 110-1 to 110-n and a multiplexer/demultiplexer 120.

The n channel cards 110-1 to 110-n correspond to the optical network units 300-1 to 300-n, respectively, and may communicate with the corresponding optical network units using an optical signal having different optical wavelengths respectively allocated for the optical network units 300-1 to 300-n. The n channel cards 110-1 to 110-n may include tunable optical modules 150-1 to 150-n for transmitting and receiving optical signals of specific wavelengths, respectively, and may communicate with the corresponding optical network units using the tunable optical modules 150-1 To 150-n. Here, since the tunable optical modules 150-1 to 150-n correspond to the tunable optical modules 350-1 to 350-n described with reference to FIGS. 1 to 3, detailed description will not be given herein.

The multiplexer/demultiplexer 120 may be connected to the n channel cards 110-1 to 110-n through a predetermined transmission medium such as an optical cable provided for each channel, and may be connected to the remote node 200 through a single transmission medium.

The multiplexer/demultiplexer 120 may multiplex optical signals (downlink signals) respectively for the wavelengths λd1, λd2, λd3, . . . and λdn generated by the tunable optical modules 150-1 to 150-*n* of the n channel cards 110-1 to 110-*n* to transmit the multiplexed optical signals to the remote node 200, and may demultiplex optical signals (uplink signals) respectively for the wavelengths λu1, λu2, λu3, . . . and λun transmitted from the optical network units 300-1 to 300-*n* through the remote node 200 to transmit the demultiplexed optical signals to the corresponding n channel cards 110-1 to 110-*n* through the tunable optical modules 150-1 to 150-*n*.

In order to enable normal communication for each channel between the corresponding channel card and the optical network unit, a wavelength of an optical signal to be transmitted and received should match a central wavelength of each channel or not deviate from a certain level. As described with reference to FIGS. 1 to 3, similar to a case where a corresponding optical network unit adjusts a wavelength using the wavelength-setting auxiliary device 500 so as to correspond a wavelength of an optical signal of a specific channel card, the optical line terminal 100 may also adjust a wavelength of a corresponding channel card using the wavelength-setting auxiliary device 500 so as to correspond to a wavelength of an optical signal of a specific optical network unit.

For example, the optical line terminal 100 sets a wavelength of an optical signal generated by the tunable optical module 150-*n* of the channel card 110-*n* using the wavelength-setting auxiliary device 500.

The wavelength-setting auxiliary device 500 may receive an optical signal transmitted from the optical network unit 300-*n* through the remote node 200 and the multiplexer/demultiplexer 120 through the tunable optical module 150-*n*. Here, the wavelength-setting auxiliary device 500 may be connected to the tunable optical module 150-*n* through the connector 550 (see FIG. 2).

The wavelength-setting auxiliary device 500 may detect a wavelength and power of the optical signal and extract wavelength information based on the detected wavelength and power of the optical signal, and may generate a test signal having a predetermined wavelength based on the extracted wavelength information and transmit the test signal to the optical network unit 300-*n*.

The wavelength-setting auxiliary device 500 may transmit the test signal to the optical network unit 300-*n* while varying the wavelength of the test signal until a return signal for the test signal is normally received from the optical network unit 300-*n*.

When the return signal for the test signal is normally received from the optical network unit 300-*n* and power of the return signal is greater than a predetermined level, the wavelength-setting auxiliary device 500 may determine a central wavelength of the return signal through a central wavelength detection algorithm, and may generate optical wavelength information for the determined central wavelength and transmit the generated optical wavelength information to the tunable optical module 150-*n*.

The tunable optical module 150-*n* generates an optical signal having a wavelength based on the received optical wavelength information so that the channel card 110-*n* may communicate with the corresponding optical network unit 300-*n*.

That is, according to the wavelength-division optical network 10' according to an embodiment of the inventive concept, it is possible to easily process optical wavelength setting of channel cards using the wavelength-setting auxiliary device 500 without separately providing the optical line terminal 100 with components for automatically implementing wavelength locking and wavelength stabilization. As a result, manufacturing costs may be reduced and simple and efficient management may be achieved.

Figure 5:
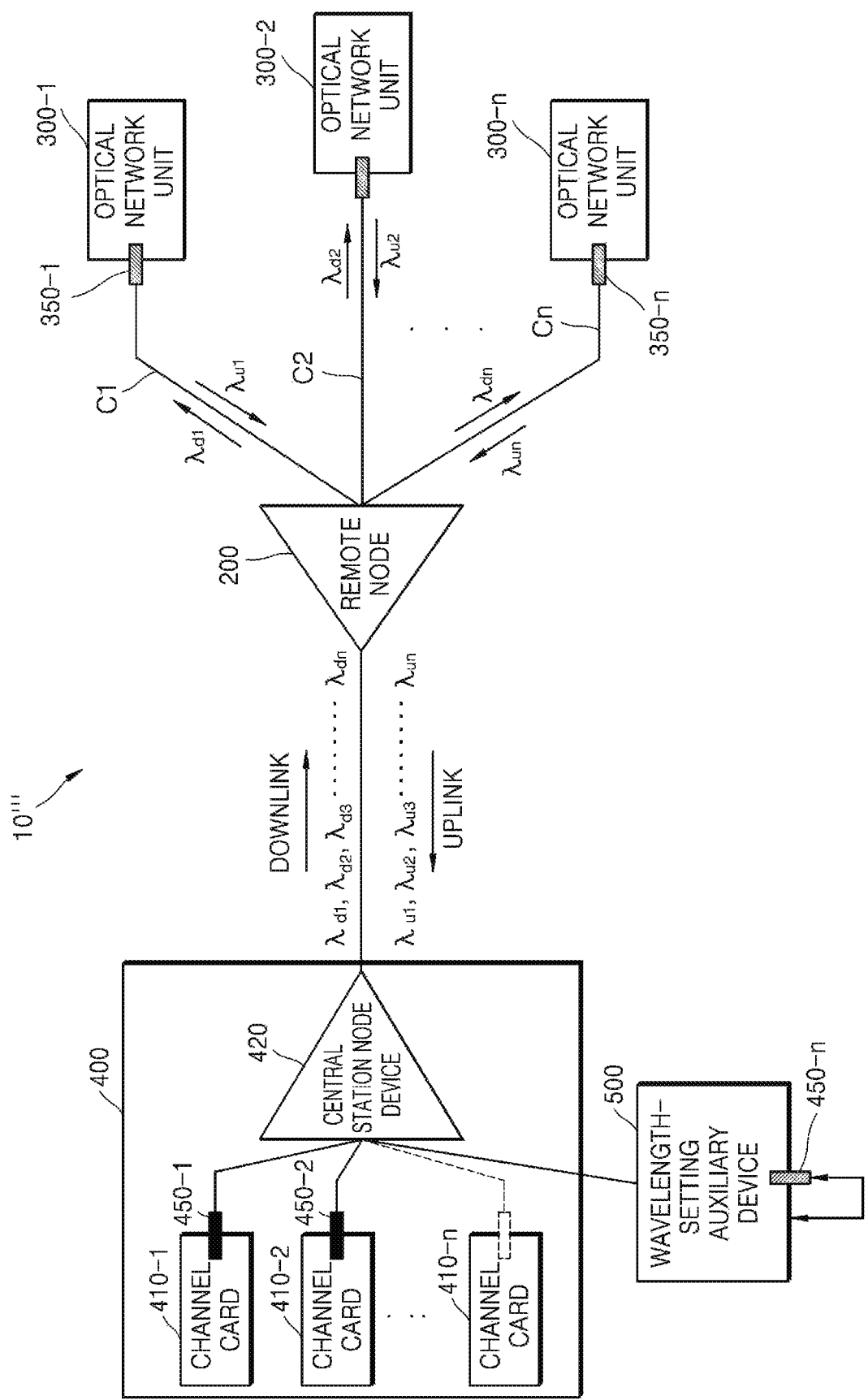
FIG. 5 is a view of a wavelength-division optical network according to another embodiment of the inventive concept.

FIG. 5 is a view of a wavelength-division optical network 10" according to another embodiment of the inventive concept. The wavelength-division optical network 10" of FIG. 5 represents a network in which a central station and a subscriber are configured in a passive manner. In FIG. 5, the same reference numerals as in FIGS. 1 to 4 denote the same elements, and descriptions thereof will not be given herein, and only the differences from FIGS. 1 to 4 will be mainly described.

Referring to FIG. 5, the optical line terminal 400 may include n (where n is an integer of 1 or more) channel cards 410-1 to 410-*n* and a central station node device 420.

The n channel cards 410-1 to 410-*n* correspond to the optical network units 300-1 to 300-*n*, respectively, and may communicate with the corresponding optical network units using an optical signal having different optical wavelengths respectively allocated for the optical network units 300-1 to 300-*n*. The n channel cards 410-1 to 410-*n* may include tunable optical modules 450-1 to 450-*n* for transmitting and receiving optical signals of specific wavelengths, respectively, and may communicate with the corresponding optical network units using the tunable optical modules 450-1 To 450-*n*. Here, since the tunable optical modules 450-1 to 450-*n* correspond to the tunable optical modules 350-1 to 350-*n* described with reference to FIGS. 1 to 3, detailed description will not be given herein.

The central station node device 420 may be connected to the n channel cards 410-1 to 410-*n* through a predetermined transmission medium such as an optical cable, respectively, and may be connected to the remote node 200 through a single transmission medium.

The central station node device 420 may transmit optical signals (downlink signals) respectively for the wavelengths λd1, λd2, λd3, . . . and λdn generated by the tunable optical modules 450-1 to 450-*n* of the n channel cards 410-1 to 410-*n* to the remote node 200, and may transmit optical signals (uplink signals) respectively for the wavelengths λu1, λu2, λu3, . . . and λun transmitted from the optical network units 300-1 to 300-*n* through the remote node 200 to the corresponding n channel cards 110-1 to 110-*n* through the tunable optical modules 450-1 to 450-*n* according to a wavelength set for each channel. Here, the central station node device 420 may be implemented with, for example, an optical filter.

Unlike FIGS. 1 and 4, in the optical line terminal 400 of the wavelength-division optical network 10", the channel cards 410-1 to 410-*n* are connected to the remote node 200 through the central station node device 420, which is a passive element. Even in this case, the optical line terminal 100 may adjust a wavelength of a corresponding channel card using the wavelength-setting auxiliary device 500 so as to correspond to a wavelength of an optical signal of a specific optical network unit. Although not shown in FIG. 5, it is needless to say that the optical network units 300-1 to 300-*n* of the wavelength division multiplexed optical network 10" may also use the wavelength-setting auxiliary device 500 similarly to FIGS. 1 to 3.

For example, the optical line terminal 400 sets a wavelength of an optical signal generated by the tunable optical module 450-*n* of the channel card 410-*n* using the wavelength-setting auxiliary device 500.

The wavelength-setting auxiliary device 500 may receive an optical signal transmitted from the optical network unit 300-*n* through the remote node 200 and the central station node device 420 through the tunable optical module 450-n. Here, the wavelength-setting auxiliary device 500 may be connected to the tunable optical module 450-n through the connector 550 (see FIG. 2).

The wavelength-setting auxiliary device 500 may detect a wavelength and power of the optical signal and extract wavelength information based on the detected wavelength and power of the optical signal, and may generate a test signal having a predetermined wavelength based on the extracted wavelength information and transmit the test signal to the optical network unit 300-n.

The wavelength-setting auxiliary device 500 may transmit the test signal to the optical network unit 300-n while varying the wavelength of the test signal until the return signal for the test signal is normally received from the optical network unit 300-n.

When the return signal for the test signal is normally received from the optical network unit 300-n and power of the return signal is greater than a predetermined level, the wavelength-setting auxiliary device 500 may determine a central wavelength of the return signal through a central wavelength detection algorithm, and may generate optical wavelength information for the determined central wavelength and transmit the generated optical wavelength information to the tunable optical module 450-n.

The tunable optical module 450-n generates an optical signal having a wavelength based on the received optical wavelength information so that the channel card 410-n may communicate with the corresponding optical network unit 300-n.

As such, the wavelength-setting auxiliary device 500 allows an administrator to easily process optical wavelength setting of a channel card or an optical network unit in the wavelength-division optical network 10 composed of passive elements. Accordingly, stable operation and efficient management are possible even when a network is constructed at a low cost.

Hereinabove, the inventive concept has been described with reference to the preferred embodiments of the inventive concept. However, it will be appreciated by those skilled in the art that various modifications and changes of the inventive concept can be made without departing from the scope of the inventive concept which are defined in the appended claims and their equivalents.

The invention claimed is:

1. A wavelength-setting auxiliary device comprising:
   an optical wavelength analyzer implemented with at least one processor and configured to:
      receive an optical signal from an optical line terminal, wherein a wavelength of the optical signal corresponds to a wavelength pre-allocated for an optical network unit, and
      execute a wavelength detection algorithm based on the optical signal to set optical wavelength information of a tunable optical module of the optical network unit; and
   a connector connected to the tunable optical module of the optical network unit to enable transmission of the optical wavelength information between the optical wavelength analyzer and the tunable optical module of the optical network unit,
   wherein the connector is configured to support at least one of a small form-factor pluggable (SFP) interface, an SFP+ interface, a 10 gigabit small form-factor pluggable (XFP) interface, and a 100 gigabit small form-factor pluggable (CFP) interface.

2. The wavelength-setting auxiliary device of claim 1, wherein the optical wavelength analyzer comprises:
   a detector configured to detect the optical signal transmitted by the optical line terminal in response to a test signal; and
   an analyzer configured to detect a power of the optical signal, detect wavelength of the optical signal by executing the wavelength detection algorithm based on the power of the optical signal, generate the optical wavelength information based on a result of the detecting the wavelength of the optical signal, and transmit the optical wavelength information to the connector.

3. The wavelength-setting auxiliary device of claim 2, wherein the optical wavelength analyzer is configured to determine whether a result of detecting the power of the optical signal meets a predetermined condition.

4. The wavelength-setting auxiliary device of claim 3, wherein the optical wavelength analyzer is configured to execute the wavelength, detection algorithm when the result of detecting the power of the optical signal meets the predetermined condition.

5. The wavelength-setting auxiliary device of claim 4, wherein the predetermined condition is that the power of the optical signal is greater than a specific level.

6. The wavelength-setting auxiliary device of claim 1, further comprising:
   a screen output unit configured to display the optical wavelength information such that a user may monitor the optical wavelength information.

7. A method of setting an optical wavelength of an optical network unit, the method comprising:
   disconnecting a cable connected to an optical line terminal from a tunable optical module of an optical network unit;
   detaching the tunable optical module from the optical network unit;
   mounting the tunable optical module on a wavelength-setting auxillary device;
   connecting, at the wavelength-setting auxillary device,
   receiving, at the wavelength-setting auxillary device, an optical signal from the optical line terminal, wherein a wavelength of the optical signal corresponds to a wavelength pre-allocated for the optical network unit; and
   setting, at the wavelength-setting auxiliary device, optical wavelength information of the tunable optical module of the optical network unit by executing a wavelength detection algorithm for the optical signal.

8. The method of claim 7, further comprising:
   after the setting of the optical wavelength information, displaying the optical wavelength information such that a user may monitor the optical wavelength information;
   disconnecting the cable from the wavelength-setting auxiliary device; and
   connecting the cable to the optical network unit through the tunable optical module.

* * * * *